Patented Feb. 17, 1953

2,628,945

UNITED STATES PATENT OFFICE 2,628,945

PROCESS FOR OBTAINING CELLULAR POLYMERIC MATERIALS

Winston J. Wayne, Wilmington, Del., assignor to E. I. du Pont de Nemours & Company, Wilmington, Del., a corporation of Delaware No Drawing. Application March 24, 1949, Serial No. 83,296

1 Claim. (Cl. 260—2.5)

This invention relates to cellular products, and more particularly to the preparation of solid, cellular, polymeric materials.

In the prepartion of cellular products, such as sponge rubber, the practice is to incorporate into the material to be blown a solid blowing agent, which under the influence of heat, evolves gas, causing the formation of numerous cells which impart porosity and low density to the finished product. Although ammonium carbonate is used for this purpose, it is far from ideal because it is difficult to disperse in polymeric materials and because it lacks the desired processing and storage stability. Another conventional blowing agent is sodium bicarbonate but, like ammonium carbonate, it is difficult to disperse in polymeric materials and it has the additional disadvantage of leaving a water-soluble salt in the polymer as a by-product. Diazoaminobenzene is still another blowing agent used but it is not wholly satisfactory because it imparts odor and discolors the polymer. Di - N - nitrosopentamethylenetetramine is also used as a blowing agent but it is hazardous to use because of its explosive nature, requiring employment as a dispersion on an inert support, i. e., silica, for safe handling. Soluble and insoluble gases are also used as blowing agents in conjunction with special processing methods. These procedures require careful control for best results.

This invention has as an object a method which overcomes the above-mentioned difficulties in the preparation of cellular polymeric materials, and which yields cellular products having small, discrete, uniform pores. Other objects will appear hereinafter.

The above objects are accomplished by incorporating into a fusible polymer from 0.5 to 20% by weight of cyclic ethylene carbonate, heating the blend to a temperature above that at which decomposition of the cyclic ethylene carbonate occurs, permitting the heated mass to expand, and then cooling.

In one embodiment polymer and cyclic ethylene carbonate are homogeneously mixed, as by milling, and the mixture compressed slightly in a steel cylinder by means of a close fitting piston. Heat is applied until the temperature is such as to bring about melting of the polymer and decomposition of the cyclic ethylene carbonate. This generally occurs in the range of 100° to 250° C. The gases resulting from the decomposition of the cyclic ethylene carbonate appear as bubbles in the molten polymer and within 1 to 10 minutes the system is under pressure. When the pressure within the cylinder has become stabilized the piston is permitted to rise until the volume occupied by the polymer-cyclic ethylene carbonate system is at least twice its original value. The cylinder is then cooled, while maintaining pressure on the system, and the expander polymer then removed from the cylinder.

In another embodiment, curing ingredients and cyclic ethylene carbonate are homogeneously mixed with polymer and the blend is then sheeted to the desired thickness. The polymer sheet is then placed in a mold of the proper depth to allow the desired degree of expansion and heat is applied until the temperature is such as to bring about the decomposition of the cyclic ethylene carbonate and to cure the polymer. The gases resulting from the decomposition of the cyclic ethylene carbonate form bubbles in the polymer, which is soft due to the heating or the softeners which have been included in the compounding formulation. At the same time the polymer proceeds to set-up by curing and, as a result, the expanded, cellular structure of the composition is maintained.

In another embodiment polymer is finely dispersed in a liquid, such as a plasticizer, in which it is not appreciably dissolved at ordinary temperatures but dissolves at elevated temperatures to form a firm, gel structure. To the polymer dispersion, which has a consistency of a thick paste, is added the cyclic ethylene carbonate, and the resulting composition is heated to such a temperature that the cyclic ethylene carbonate decomposes and the polymer dissolves in the liquid to form a firm gel which stabilizes the bubbles of decomposition gases. Upon cooling under pressure a sponge of plasticized polymer is obtained.

Cyclic ethylene carbonate can be prepared by ester interchange between diethyl carbonate and ethylene glycol. (J. Am. Chem. Soc., 68, 783 (1946)) or by reaction of ethylene oxide and carbon dioxide using a sodium hydroxide catalyst, heat, and pressure (German Patent 740,366).

The examples which follow are submitted to illlustrate and not to limit this invention.

Example I

| | Parts |
|---|---|
| Pale crepe rubber (Williams plasticity 90) | 100 |
| Zinc oxide | 5 |
| Stearic acid | 5 |
| Petroleum oil (Circo oil) | 10 |
| Calcium carbonate (Camelwite) | 50 |
| Sulfur | 3.4 |
| 91% zinc salt of mercaptobenzothiazole/ 9% di-ortho-tolyguanidine (Zenite B) | 1.5 |
| Cyclic ethylene carbonate | 4 |

The above composition was prepared by milling the ingredients together on a two-roll rubber mill until homogeneous. The cyclic ethylene carbonate, because of its low melting point (37° C.) and organic nature, was easily dispersed in the rubber to give a very homogeneous dispersion or solution. When the composition reached a homogeneous state it was sheeted out to a thickness of approximately 0.166". The sheeted material was then placed in a mold 0.5" deep and subjected to a temperature of 153° C. for 20 minutes. During the heating period the cyclic ethylene carbonate decomposed to carbon dioxide and ethylene oxide, which formed cells within the polymer sheet and expanded it to fill the mold. At the same time the rubber was vulcanized and thus prevented collapse of the cell structure. After the material was cooled to room temperature, it was removed from the mold and was ready for use. There was a 200% increase in thickness as a result of the blowing of the compound. Because of the intimate dispersion of the cyclic ethylene carbonate and rubber, the cells were very fine and uniform. The cells of the sponge were finer and more uniform than those of a sponge prepared in a like manner, except that the rubber was blown with an equal portion of a 50% dispersion of finely divided sodium bicarbonate in oil (Unicel S).

*Example II*

| | Parts |
|---|---|
| Polymerized chloro-2-butadiene-1,3 | 100 |
| Tissue paper | 5 |
| Stearic acid | 2.5 |
| Petrolatum | 5 |
| Carbon black | 8.4 |
| Zinc oxide | 7.5 |
| Magnesium oxide | 3.4 |
| Dicapryl phthalate | 7.5 |
| Sulfur | 1 |
| Clay (Crown) | 3.4 |
| Cyclic ethylene carbonate | 8.4 |

The above composition was mixed until homogeneous by milling on a two roll mill and then sheeting to 0.08" thickness. Thereafter the composition was placed in a 0.25" mold and heated at 153° C. for 30 minutes. During the heating period the sheet expanded to fill the mold and the chloro-2-butadiene-1,3 polymer was vulcanized. There was a 200% increase in thickness and the sponge contained very uniform, fine cells. A sponge made in the identical way except that ammonium bicarbonate was used instead of cyclic ethylene carbonate contained pores which were larger and more irregular than those of the cyclic ethylene carbonate sponge.

*Example III*

| | Parts |
|---|---|
| Polymerized chloro-2-butadiene-1,3 | 100 |
| Magnesium oxide | 4 |
| Phenyl-alpha-naphthylamine (Neozone A) | 2 |
| Calcium carbonate (Camelwite) | 2 |
| Petrolatum | 3 |
| Petroleum oil (Circo oil) | 15 |
| Zinc oxide | 5 |
| Cyclic ethylene carbonate | 4 |

The above composition was milled until homogeneous and then sheeted to a thickness of 0.166". The sheet was then placed in a 0.5" mold and heated at 153° C. for 30 minutes. A sponge resulted which filled the mold and consisted of fine, uniform pores. The pores were as fine and uniform as those of a sponge made in a similar way using an equal amount of 50% dispersion of finely ground sodium bicarbonate in oil (Unicel S) in place of the cyclic ethylene carbonate as blowing agent. In this case the cyclic ethylene carbonate was easily dispersed or dissolved in the polymer whereas the sodium bicarbonate had to be specially dispersed in oil beforehand to obtain satisfactory dispersion in the polymer.

*Example IV*

| | Parts |
|---|---|
| Chlorosulfonated ethylene polymer | 100 |
| Zinc salt of xylyl mercaptan (RPA 5) | 2 |
| Tissue paper | 16 |
| Petroleum oil (Circo oil) | 24 |
| Petrolatum | 30 |
| Rosin | 5 |
| Clay (Crown) | 16 |
| Titanium dioxide (Ti-Pure FF) | 4 |
| Magnesium oxide | 12 |
| Benzothiazyl disulfide (MBTS) | 1 |
| Cyclic ethylene carbonate | 4 |

The composition was mixed on a two roll rubber mill until homogeneous, sheeted to a thickness of 0.166", placed in a 0.5" mold and heated at 153° C. for one hour. During the heating period the cyclic ethylene carbonate decomposed to carbon dioxide and ethylene oxide and these, in the form of small bubbles, expanded the sheet to fill the mold and the composition was cured in the expanded state. A satisfactory sponge with fine, uniform pores was obtained.

*Example V*

| | Parts |
|---|---|
| Chlorinated ethylene polymer (27% chlorine) | 100 |
| Basic lead carbonate | 10 |
| Glycerol monolaurate | 1 |
| Dioctyl phthalate | 40 |
| Cyclic ethylene carbonate | 8 |

The composition was blended on a two roll mill at 100° C. until homogeneous, placed in a steel cylinder fitted with a close fitting piston, and compressed in the cylinder at 100° C. by means of the piston. The cylinder was then heated to 150° C. and the piston permitted to rise as the composition expanded. Pressure was maintained on the system while the cylinder was cooled after 15 minutes of heating. The expanded polymer was then removed from the cylinder. Heating the polymer composition to 100° C. softened it sufficiently so that it could be compressed to a compact mass and subsequent heating to 150° C. for 15 minutes brought about the decomposition of the cyclic ethylene carbonate and the resulting gases expanded the composition. Cooling the cylinder, while the pressure was maintained by means of the tight fitting piston, set the polymer in its expanded porous condition.

*Example VI*

| | Parts |
|---|---|
| Ethylene polymer (molecular weight 20,000–30,000) | 100 |
| Calcium carbonate (Kalvan) | 25 |
| Cyclic ethylene carbonate | 5 |

The above composition was blended on a two roll mill at 105° to 110° C. until homogeneous, taking care to keep the milling time at a minimum to prevent premature blowing. The blend was transferred to a steel cylinder carrying a close-fitting piston, heated at 130° C. for 5 minutes, and then compressed to a compact mass by means of the piston. The cylinder was then heated to 165° C. for 5 minutes and the piston permitted to rise as the polymer composition expanded due to the decomposition of the cyclic ethylene carbonate. The cylinder was then cooled, while maintaining pressure on the system, and the expanded mass removed from the cylinder. The composition was expanded about 100% and contained small, uniform cells. It was odorless and uncolored.

The composition could also be blended by dissolving the ethylene polymer in toluene at 90° C., stirring the calcium carbonate into the thick solution, adding the cyclic ethylene carbonate which dissolves in toluene, casting the composition as a thin film and allowing the toluene to evaporate.

Example VII

| | Parts |
|---|---|
| Polyacrylonitrile (molecular weight 70,000) | 100 |
| Calcium carbonate (Kalvan) | 25 |
| Cyclic ethylene carbonate | 100 |

The above composition was blended on a two roll mill at 100° to 110° C. until homogeneous. The blended composition was then dispersed in water by means of a Waring Blendor and washed sufficiently with water so that after drying, the composition contained only 50 parts of cyclic ethylene carbonate per 100 parts of polyacrylonitrile. The composition was then placed in a steel cylinder, heated at 165° C. for 5 minutes and compressed to a solid mass by means of a close fitting piston. Heating at 165° C. was continued for another 5 minutes, the piston being allowed to rise as the composition expanded. The cylinder was then cooled while pressure was maintained and the expanded polymer composition removed. The resulting structure contained discrete uniform pores and was somewhat flexible. In this case only a portion of the cyclic ethylene carbonate present was utilized in the blowing operation, the remainder functioning as a plasticizer for the polyacrylonitrile expanded structure.

The polyacrylonitrile composition may also be blended by dissolving the polymer in cyclic ethylene carbonate at 100° C., stirring the calcium carbonate into the thick solution, casting a film and extracting excess cyclic ethylene carbonate by dispersion in water.

Example VIII

| | Parts |
|---|---|
| N-Methoxymethyl polyhexamethyleneadipamide (40–50% of the amide groups substituted with methoxymethyl groups) | 100 |
| Calcium carbonate (Kalvan) | 5 |
| Citric acid | 2 |
| Cyclic ethylene carbonate | 5 |

The composition was blended on a two roll mill until homogeneous, sheeted, placed in a mold, heated to 160° C. for 1 minute and pressed to form a solid mass and then allowed to expand freely while heating at 160° C. was continued for another 10 minutes, the mold cooled, and the sample removed. A sponge was obtained. During the heating period the polymer composition was expanded by the gaseous decomposition products of the cyclic ethylene carbonate to 200% of its original volume, and the expanded form was retained after cooling.

Example IX

| | Parts |
|---|---|
| Polyvinyl chloride (Geon 100X 210) | 100 |
| Dibutyl Cellosolve phthalate | 17.5 |
| Tricresyl phosphate | 52 |
| Blown castor oil | 1.7 |
| Ortho-phenyl phenol | 2.7 |
| Pigment | 92 |
| Calcium carbonate (Kalvan) | 20 |
| Cyclic ethylene carbonate | 5 |

The pigment and calcium carbonate were dispersed in the liquid plasticizers by ball milling and the polyvinyl chloride, as a very finely divided powder, was dispersed into the pigment grind by means of a Werner-Pfleiderer mixer to form a paste composition. The cyclic ethylene carbonate was then dissolved in the paste by stirring. The paste was placed in a mold, heated at 210° C. for 3 minutes, the mold cooled, and the expanded polymer composition removed. The volume of the sponge was 200% that of the original polymer. The cells of the sponge were uniform in size.

Cyclic ethylene carbonate is a solvent for certain polymers and is compatible in small amounts with a wide variety of polymers. As a result an intimate, uniform mixture with polymer compositions to be blown is easily brought about. Cyclic ethylene carbonate is thus a solvent type blowing agent and differs fundamentally from the usual inorganic bicarbonate blowing agents which are difficult to disperse in polymers. In addition, it is stable during processing and subsequent storage of the polymer stock, it is non-explosive and non-staining, it leaves no undesirable by-products upon decomposition, and it produces fine, uniform pores.

The temperature employed in the process of this invention is that at which decomposition of the cyclic ethylene carbonate occurs. This is within the range of 100° to 250° C. At the lower temperature the decomposition is slow and at the upper temperature secondary reactions such as decomposition of the polymer begin to take place. In practice, a temperature is selected which is high enough to bring about rapid decomposition of the cyclic ethylene carbonate and yet low enough to be safely employable with the particular polymer employed. This is generally in the range of 120° to 200° C.

The presence of catalytic amounts of basic or acidic materials lowers the decomposition temperature of the cyclic ethylene carbonate. If the polymer is free of basic or acidic residual material then an amount of such material in the range of from 0.01 to 10%, based on the combined weight of polymer and cyclic ethylene carbonate, is added. Suitable basic and acidic materials are zinc chloride, calcium chloride, magnesium oxide, zinc oxide, lead oxide, calcium carbonate, basic lead carbonate, sodium and potassium hydroxide, sodium carbonate, hydrochloric acid, maleic acid, etc.

The amount of cyclic ethylene carbonate employed may range from 0.5 to 20% by weight of the polymer. As a rule the amount used is from 1 to 10% by weight of the polymer.

Substituted cyclic ethylene carbonates such as cyclic methylethylene carbonate, cyclic sym-dimethylethylene carbonate, cyclic tetramethylethylene carbonate, cyclic chloromethylethylene carbonate and cyclic vinylethylene carbonate will also function as blowing agents by evolution of carbon dioxide but they are not suitable because they decompose at higher temperatures where decomposition of the polymer is more apt to occur. For example, in the presence of 50% of calcium chloride as catalyst, cyclic sym-dimethylethylene carbonate does not decompose appreciably until 190° C. and cyclic tetramethylethylene carbonate is still stable at 200° C.

Instead of placing the blend of polymer and cyclic ethylene carbonate in a cylinder and expanding the molten polymer by partial release of the pressure by withdrawal of a piston, the molten froth may be ejected through an extrusion nozzle while cooling the polymer. This extrusion technique permits the preparation of cellular products of any desired size by simply selecting the equipment of suitable dimensions.

For cellular products of a given density, variation in pore size produces a corresponding variation in some of the physical properties of the material. Thus, a small pore size leads to increased form stability and improved thermal insulating properties. Cellular products of similar density but of larger pore size appear to be more resilient and slightly less efficient as thermal insulators.

In the practice of this invention there may be used any linear fusible, macromolecular polymer, whether of natural or synthetic origin, which is thermally stable at temperatures in the range of 100° to 250° C. Examples of natural and modified natural polymers usefully employable in the practice of this invention are rubber, gutta percha, balata, nitrocellulose, cellulose acetate, cellulose propionate, ethyl cellulose, etc. The synthetic polymers are those obtainable either by addition polymerization or by condensation polymerization.

Examples of addition polymers are those obtainable from vinyl and vinylidene compounds. There are numerous substances of this type, and by way of examples, may be mentioned vinyl ester polymers, e. g., polyvinyl acetate, polyvinyl chloride, polyvinyl fluoride, polyvinyl bromide, etc., polyvinylidene chloride polyvinylidene fluoride, etc., polyvinyl ethers, e. g., poly (methyl vinyl ether), poly (ethyl vinyl ether), etc., polymers of 1-chloro-1-fluoroethylene, vinyl chloride/vinyl carbosylate polymers, e. g., vinyl chloride/vinyl acetate polymers, etc., polyacrylonitrile, polymethacrylonitrile, polystyrene, alkyl polyacrylates, and polyalkacrylates, e. g., poly (methyl acrylate), poly (butyl acrylate), poly (methyl methacrylate), poly (octyl methacrylate), etc., vinyl chloride/maleic anhydride copolymers, etc., ethylene polymers prepared as described in U. S. Patent 2,153,553, polymers of ethylene with other polymerizable organic compounds prepared by reacting ethylene in admixture with the other polymerizable organic compound at temperatures of 20° to 350° C., under pressures in excess of 50 atmospheres, in the presence of a vinyl polymerization catalyst such as a peroxy compound as disclosed in U. S. Patent 2,396,677.

The natural elastomers, e. g., natural rubber and gutta percha and the synthetic elastomers such as poly (2-chlorobutadiene-1,3) and the copolymers of 1,3-diene hydrocarbons, e. g., butadiene-1,3, 2-methyl-butadiene-1,3 etc., with acrylonitrile, styrene, and methyl methacrylate constitute a particularly preferred group because of the wide utility of cellular products obtained therefrom.

Examples of fusible, macromolecular condensation polymers useful in the practice of the present invention are the synthetic linear polyamides, polyesters, polyester-amides, polyacetals, polyethers and polyanhydrides of the general types described in U. S. Patent 2,071,250. Of these synthetic macromolecular polymers the polyamides are especially suitable. These are made as disclosed in U. S. Patents 2,071,253 and 2,130,948 by methods which comprise self-polymerization of a monoaminocarboxylic acid and by reaction of essentially equimolar amounts of a dibasic acid with a diamine. Examples of such polyamides are polymerized aminocaproic acid, polyhexamethylene-adipamide, and polyhexamethylenesebacamide. Polyamides containing heteroatoms, as described in U. S. Patents 2,158,064 and 2,191,556 can also be used. The interpolyamides because of their versatility of properties represent a valuable class of linear polymers for use in the process of this invention. Such interpolyamides are obtained by reacting together a plurality of polyamide-forming reactants, e. g., as described in U. S. Patents 2,252,554 and 2,252,555. An especially suitable interpolyamide is the product obtained by reacting together about 40% of hexamethylenediammonium adipate, 30% of hexamethylenediammonium sebacate, and 30% of omega-amino-caproic acid as described in U. S. Patent 2,285,089.

The polyester-amides are the macromolecular condensation polymers described in U. S. Patents 2,071,250, 2,224,037, and 2,312,879. These polyester-amides are prepared, for example, by reacting an omega-hydroxy acid with a diamine and a dibasic acid, by reacting a glycol with a diamine and a dibasic acid, or by reacting a glycol with an amino acid and a dibasic acid.

The polyesters are the high molecular weight polymers described in U. S. Patent 2,071,250 and which are made by self-esterification of hydroxyacids, such as omega-hydroxydecanoic acid, or by reaction of dibasic acid such as suberic, terephthalic, sebacic, etc., with a dihydric alcohol, e. g., ethylene glycol, etc.

Further types of polymers useful for the present purpose are the polyethers and polyanhydrides described in U. S. Patent 2,071,250 and the polyacetals of U. S. Patent 2,071,252.

Modified synthetic polymers may also be used in the process of this invention. Examples of such are the N-alkoxymethyl polyamides obtained by reacting at moderate temperature (25° to 75° C.) a formic acid solution of a polyamide with alcohol and formaldehyde, or by other methods described in U. S. Patent 2,430,860, chlorinated ethylene polymers such as disclosed in U. S. Patent 2,183,556, the dehalogenated halogenated ethylene polymers of U. S. Patent 2,261,751, the chlorosulfonated ethylene polymers of U. S. Patent 2,212,786, polyvinyl formals, acetals, and formals formed by reacting either polyvinyl alcohol or a partially hydrolyzed polyvinyl carboxylate with an aldehyde, e. g., formaldehyde, acetaldehyde, butyraldehyde, etc.

Blends of cyclic ethylene carbonate with the above mentioned natural or synthetic elastomers, ethylene polymers, polyamides, polyesters, polyesteramides, polyacetals, polyethers, polyanhydrides, etc., are new compositions of matter.

To the polymers or to the blends of polymer and cyclic ethylene carbonate there may be added pigments, plasticizers, dyes, cross-linking agents, fillers, or any other desired ingredients.

In suitable form the cellular products of this invention are useful as shock absorbers, heat and sound insulators, etc.

As many apparently widely different embodiments of this invention may be made without departing from the spirit and scope thereof, it is to be understood that this invention is not limited to the specific embodiments thereof except as defined in the appended claim.

I claim:

A process for obtaining a cellular product which comprises blending a fusible, organic macromolecular polymer thermally stable at a temperature of at least 200° C. with 0.5% to 20%, by weight of said polymer, of cyclic ethylene carbonate, heating the resulting blend in a closed space having a volume less than twice that of said blend, to a temperature of 120° C. to 200° C. until said cyclic ethylene carbonate is decomposed, permitting said blend to expand to at least twice its original volume while under greater than atmospheric pressure, and then cooling the resulting expanded product while maintained under greater than atmospheric pressure.

WINSTON J. WAYNE.

REFERENCES CITED

The following references are of record in the file of this patent:

UNITED STATES PATENTS

| Number | Name | Date |
|---|---|---|
| 2,432,447 | Scheiderbauer | Dec. 9, 1947 |
| 2,461,942 | Ten Broeck | Feb. 15, 1949 |
| 2,570,200 | Bruson | Oct. 9, 1951 |

FOREIGN PATENTS

| Number | Country | Date |
|---|---|---|
| 236,024 | Switzerland | May 16, 1945 |

OTHER REFERENCES

Vorlander, Justus Liebig's Annalen der Chemie 280 (1894), pp. 186–188.

"Unicel ND" Report No. 47—3, May 1947, Rubber Chem. Div., Du Pont, Wilmington, Del.